Patented July 19, 1938

2,124,238

UNITED STATES PATENT OFFICE 2,124,238

PROCESS FOR PRODUCING PYRIDINO-ANTHRAQUINONE DERIVATIVES AND PRODUCTS THEREOF

Heinz Scheyer, Frankfort-on-the-Main, and Emil Schwamberger, Frankfort-on-the-Main-Fechenheim, Germany, assignors to General Aniline Works, Inc., New York, N. Y., a corporation of Delaware No Drawing. Original application May 6, 1936, Serial No. 78,224. Divided and this application October 2, 1937, Serial No. 167,022. In Germany May 16, 1935

3 Claims. (Cl. 260—40)

The present application is a division of our application Serial No. 78,224, filed May 6, 1936, which relates to a process for producing condensation products of the anthraquinone series. The process described and claimed therein comprises acting in an organic solvent and in the presence of strong alkaline acting agents with primary aromatic amines of the benzene, naphthalene and anthraquinone series on 1.2-benzanthraquinones.

Our present invention relates to a process for producing condensation products of the anthraquinone series. The new process comprises acting in an organic solvent and in the presence of strong alkaline acting agents with primary aromatic amines on pyridino-anthraquinones of the general formula:

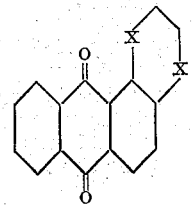

wherein one X stands for CH and the other X stands for N.

As primary aromatic amines those of the benzene, naphthalene and anthraquinone series which may contain besides the amino group further substituents are suitable, particularly primary amines of ring systems capable of being vatted.

The reaction probably takes place in such a manner that the amino group reacts, while splitting off hydrogen, with the anthraquinone nucleus. So the condensation product of 1,2(N)-pyridino-anthraquinone and 1-amino-anthraquinone probably corresponds with the formula:

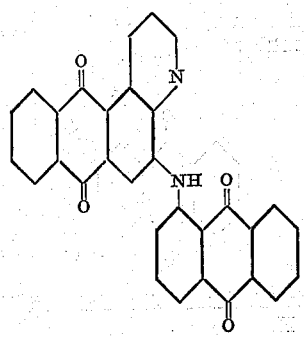

The condensation products thus obtained are valuable intermediates for the production of dyestuffs, particularly, so far as they contain the radicle of a vattable amine, they are dyestuffs themselves of a good tinctorial power and good fastness properties.

In order to further illustrate our invention the following examples are given, the parts being by weight and all temperatures in degrees centigrade.

Example 1

A mixture of 3 parts of 1.2(N)-pyridinoanthraquinone, 2 parts of 2-nitraniline, 15 parts of caustic potash and about 60 parts of pyridine is stirred for about 24 hours at about 50°. The separated reaction product is filtered off, washed and dried. It crystallizes from chlorobenzene in orange-red crystals, soluble in concentrated sulfuric acid with a violet color turning to blue when adding paraformaldehyde. The condensation product corresponds to the formula:

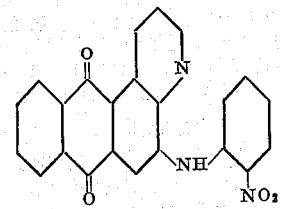

By treatment with sulfuric acid monohydrate at room temperature a sulfonic acid is formed which dyes wool from an acid bath orange shades.

When replacing 2-nitraniline by the corresponding amount of 5-chloro-2-aminobenzoic acid a violet carboxylic acid is obtained which yields an orange benzacridone by treatment with chlorosulfonic acid.

Example 2

A mixture of 3 parts of 1.2(N)-pyridinoanthraquinone, 2 parts of 2-naphthylamine, 10 parts of finely powdered caustic potash and about 60 parts of pyridine is stirred for about 12 hours at room temperature. The condensation product thus obtained of the formula:

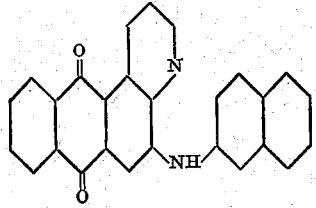

forms when recrystallized for instance from chlorobenzene bluish red needles, soluble in concentrated sulfuric acid with a greenish yellow color turning to blue when adding paraformaldehyde.

By treatment with concentrated sulfuric acid at about 50° a sulfonic acid is obtained dyeing the animal fibers from an acid bath bright bluish red shades.

*Example 3*

A mixture of 2.6 parts of 1.2(N)-pyridinoanthraquinone, 2.5 parts of 1-aminoanthraquinone, 5 parts of powdered caustic potash and about 40 parts of pyridine is stirred for about 5 hours at about 50°. The condensation product formed of the formula:

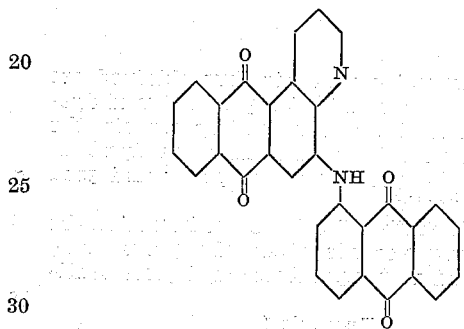

crystallizes from highly boiling organic solvents such as nitrobenzene in bright red needles. It dissolves in concentrated sulfuric acid with a blue, in sulfuric acid of 80% strength with a red color and dyes cotton red shades of a good fastness to chlorine and boiling carbonate solution. The product is identical with the condensation product obtained by condensing 3-bromo-2(N)-1-pyridinoanthraquinone with 1-aminoanthraquinone.

When using as one reaction component an 1.2(N)-pyridinoanthraquinone derivative, the py-2-position of which is substituted by the 2.6-dichlorophenyl radicle, a somewhat more bluish red dyestuff is obtained.

*Example 4*

A mixture of 2.6 parts of 1(N),2-pyridinoanthraquinone, 2.5 parts of 1-aminoanthraquinone, 3 parts of powdered caustic potash and about 30 parts of alcohol is boiled for about 6 hours in a vessel provided with a stirrer and a reflux condenser. The precipitate formed is isolated and may be separated from some unchanged initial products by extraction with organic solvents such as chlorobenzene. It crystallizes from nitrobenzene, dissolves in concentrated sulfuric acid with a pure blue color and dyes cotton from a yellowish red vat red shades of a more yellowish tint than the product of the foregoing example. The new compound corresponds to the formula:

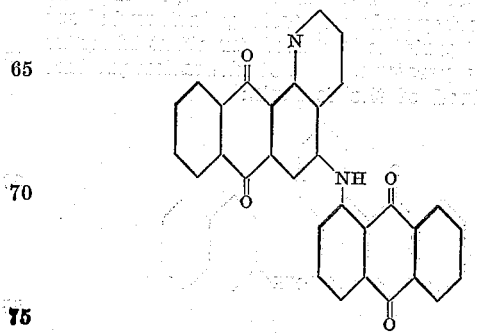

When condensing in the same manner 1(N),2-5(N),6-di-pyridinoanthraquinone with two molecular proportions of 1-aminoanthraquinone a red dyeing vat dyestuff is obtained.

*Example 5*

A mixture of 2.6 parts of 1.2(N)-pyridinoanthraquinone, 3.6 parts of 1-amino-4-benzoyl-aminoanthraquinone, 10 parts of caustic potash and about 80 parts of pyridine is stirred for some time at about 50°. The liquor becomes bluish colored and the formed condensation product is isolated. It corresponds to the formula:

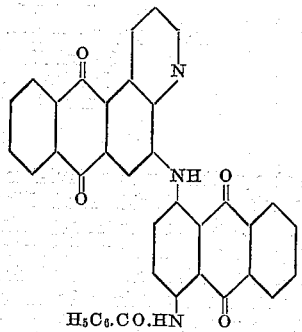

and is identical with the product obtainable by condensing 3-bromo-1.2(N)-pyridinoanthraquinone with 1-amino-4-benzoyl-aminoanthraquinone. It crystallizes from dichlorobenzene and dissolves in concentrated sulfuric acid with a yellowish green color.

In this case the splitting of hydrogen is advantageously carried out in the presence of an oxidant, for instance by passing air through the reaction mass.

*Example 6*

A mixture of 2.6 parts of 1.2(N)-pyridinoanthraquinone, 2.3 parts of 2-aminoanthraquinone, 10 parts of finely powdered caustic potash and about 60 parts of pyridine which is free from water is stirred for about 24 hours at room temperature. The condensation product formed of the formula:

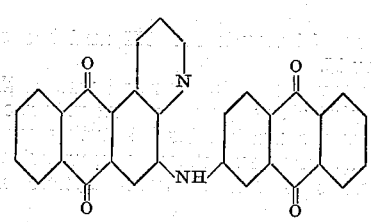

dyes cotton from the vat red shades.

We claim:

1. A process for producing condensation products of the anthraquinone series which comprises acting in an organic solvent and in the presence of strong alkaline acting agents with primary amines of the benzene, naphthalene and anthraquinone series on pyridino-anthraquinones of the general formula:

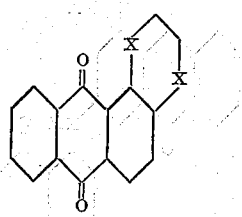

wherein one X stands for CH and the other X stands for N.

2. The vat dyestuff of the formula:
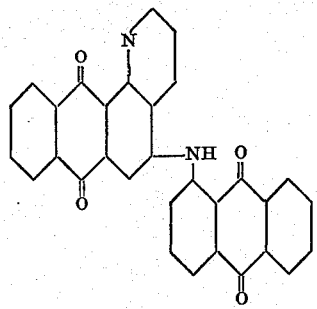
which vat dyestuff dissolves in concentrated sulfuric acid with a pure blue color and dyes cotton from a yellowish red vat red shades.
3. The vat dyestuff of the formula:
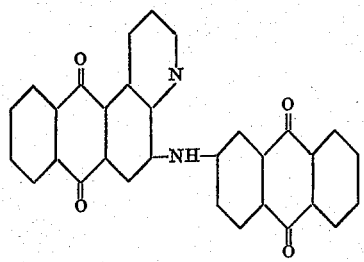
which vat dyestuff dyes cotton from the vat red shades.
HEINZ SCHEYER.
EMIL SCHWAMBERGER.